April 4, 1939.   E. A. GRANGE ET AL   2,152,685
WHEEL
Filed Dec. 13, 1935   2 Sheets-Sheet 2
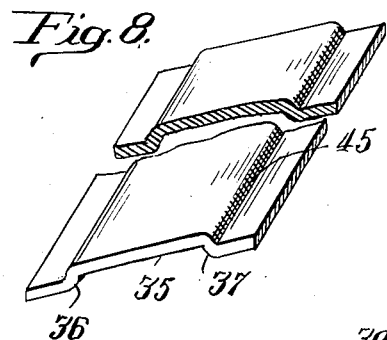
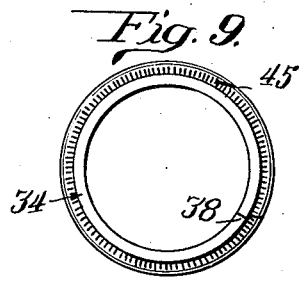
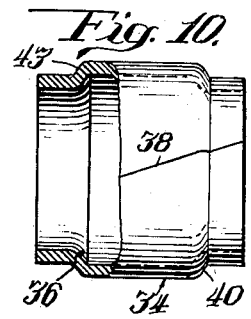
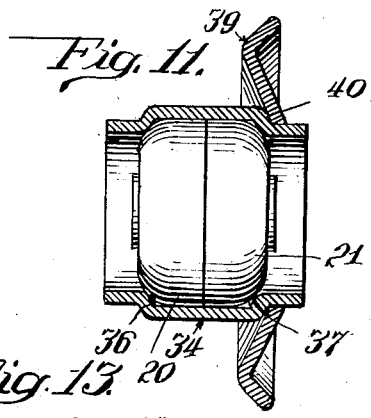
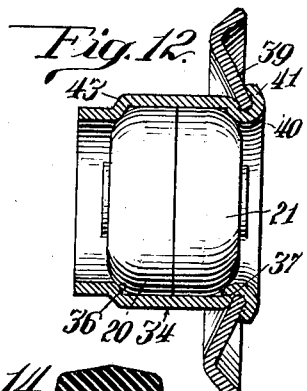
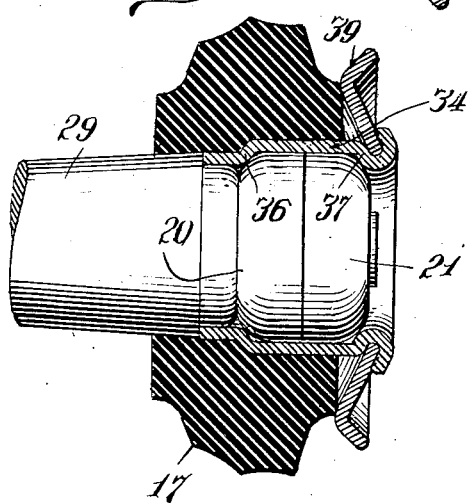
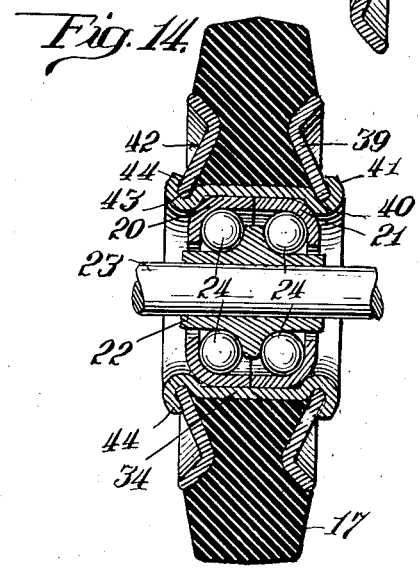
Inventors
Edward A. Grange
and
Erwin J. Schmidt
By Fricke & DeBush
Attorneys

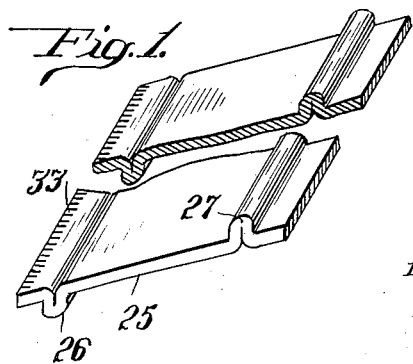
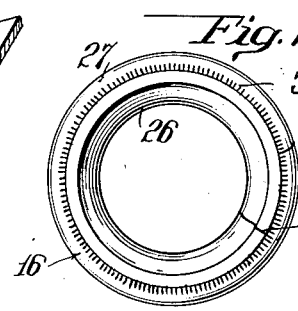
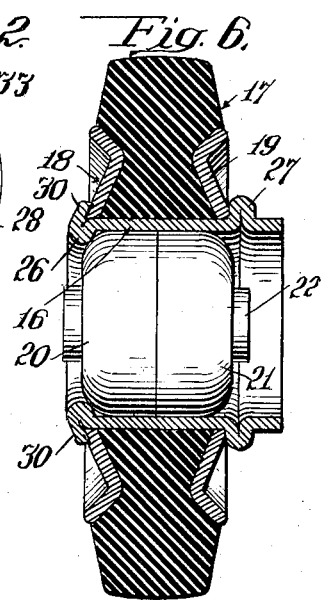
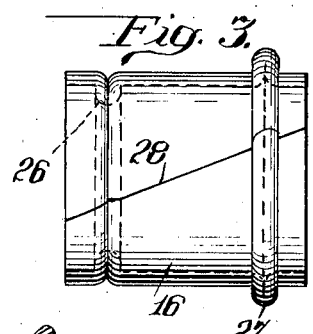
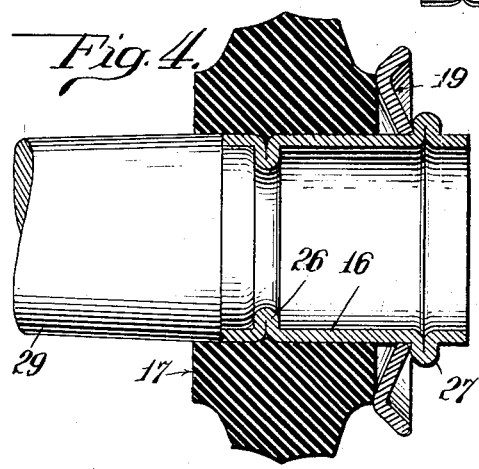
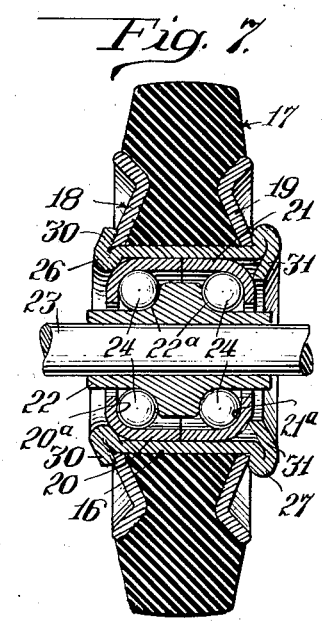
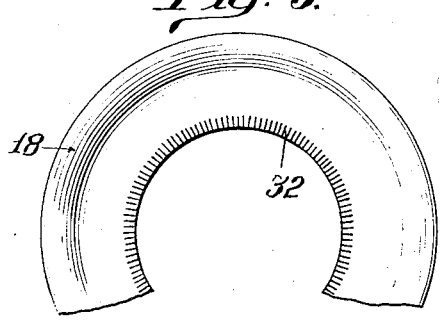

UNITED STATES PATENT OFFICE 2,152,685

WHEEL

Edward A. Grange and Erwin J. Schmidt, Chicago, Ill., assignors to Allied Engineering Company, Chicago, Ill., a corporation of Illinois Application December 13, 1935, Serial No. 54,209

8 Claims. (Cl. 301—5.7)

Our invention relates to wheels of the type described and claimed in the application of ourselves and Alexander F. Kaptuller, Serial No. 51,318, filed November 23, 1935, and it is an object of our invention to provide a new and improved form and arrangement of parts in a wheel of the aforesaid type by means of which the required metal parts therefor may be made at low cost by stamping them from sheet material, the assembly of the parts may be easily and quickly effected, and the parts making up the complete wheel may be held securely in their assembled and connected condition.

As will be readily appreciated, a wheel of the type mentioned, preferably equipped with a double row of ball bearings, is in many uses subjected to great stresses by reason of which there is a tendency for the tread member of soft rubber-like material to become displaced radially and/or circumferentially with respect to the mounting and supporting means, and there is also a tendency for the bearing cups to become separated resulting in too much play between the bearing parts, and it requires, therefore, a secure and effective locking means for holding the parts in their operative position. It is one of the objects of our invention to provide in a wheel of this type a maximum of strength with a minimum of weight of materials whereby the wheel shall be suitable for use to advantage in many different situations and in particular on roller skates.

A further object of our invention is to provide an improved arrangement of parts comprising a single sleeve member capable of performing efficiently a double function, namely, the retention of the flanges in operative locking position at opposite sides of the compressed tread member on the outside of the sleeve and the retention of the parts of the ball bearing assembly in operative position within the sleeve. For the accomplishment of these purposes effectively, it is necessary that the parts be capable of assembly upon a commercial basis without either too great or too little play between the parts of the bearings and that the parts when once assembled shall be held securely without any appreciable tendency for the parts to spread apart or loosen up in use, and it is an object of our invention to provide such an arrangement.

It is another object of our invention to improve devices of this type in sundry details hereinafter pointed out. The preferred means by which we have accomplished our several objects are illustrated in the drawings and are hereinafter specifically described. That which we believe to be new and desire to cover by Letters Patent is set forth in the claims.

In the drawings,—

Fig. 1 is a perspective view of a strip of sheet metal pressed or rolled into special form for use in making one form of sleeve for our improved wheel;

Fig. 2 is an end view and Fig. 3 is a side elevational view of the sleeve formed from the strip of Fig. 1;

Fig. 4 is a longitudinal sectional view of the sleeve, showing one of the flanges mounted thereon and the material to form the tread in expanded condition on the sleeve;

Fig. 5 is a side elevational view of a fragmentary portion of one of the tread holding flanges;

Fig. 6 is a sectional view of the sleeve with the flanges and tread of rubber-like material mounted thereon and the parts forming the bearing positioned within the sleeve ready to be secured therein;

Fig. 7 is a view similar to Fig. 6 but showing the bearing parts locked in position within the sleeve, the bearing cone and the bearing cups being shown in section on a fragmentary portion of an axle;

Fig. 8 is a perspective view of a strip of sheet metal pressed or rolled into special form for use in making a modified form of mounting sleeve for our improved wheel;

Fig. 9 is an end view and Fig. 10 is a side elevational view, partly in section, of a sleeve formed from the strip of Fig. 8;

Fig. 11 is a longitudinal sectional view through the sleeve of Figs. 9 and 10 but showing antifriction bearing means positioned within the sleeve and showing one of the flanges in position on the sleeve;

Fig. 12 is a view similar to Fig. 11 but showing the end of the sleeve adjacent the flange thereon turned outwardly against the outer side of the flange for holding it in position;

Fig. 13 is a view similar to Fig. 12 but showing also the tread member in uncompressed condition on the sleeve; and Fig. 14 is a vertical sectional view through the completed wheel and bearing and showing a fragmentary portion of an axle in position therein.

Referring now to the several figures of the drawings in which corresponding parts are indicated by the same reference characters, it will be noted that our improved wheel comprises a sleeve 16, a tread member 17 in position on the sleeve between supporting flanges 18 and 19, and a bearing comprising cups 20 and 21, in edge to edge relation with respect to each other, positioned within the sleeve. The bearing includes a cone member 22 having an opening therethrough to receive an axle 23 and having in its outer surfaces raceways 22a for the balls 24, the cups 20 and 21 being provided with raceways 20a and 21a respectively for the balls.

In the form of our invention shown in Figs. 1 to 7 inclusive, the sleeve 16 is formed of a strip of sheet metal 25 rolled or pressed into form so as to provide an inwardly extending annular shoulder 26 and an outwardly extending annular shoulder 27, such shoulders being formed by doubling the metal back upon itself so that the margins of the strip remain in substantially the same plane as the main or central portion thereof. The strip 25 is then bent into the form of the split sleeve 16 with the shoulder 26 on the inside and the shoulder 27 on the outside thereof. The ends of the strip 25 are cut on a bias so that when the strip is bent into the form of a sleeve the meeting edges thereof extend obliquely with respect to the axis of the sleeve as best shown at 28, Fig. 3, the purpose of which will be pointed out presently.

In making the wheel, the flange 19 is slipped over the left end of the sleeve, Fig. 3, and positioned against the shoulder 27. A ring of soft rubber-like material of suitable quality and of a predetermined shape and size to form the tread member 17 is expanded diametrically by sliding it over a tapered driftpin 29 and it is then forced onto the sleeve against the flange 19 as shown in Fig. 4. The flange 18 is then placed against the opposite side of the tread member and the tread member is further expanded diametrically and is substantially compressed axially in the manner described in the aforesaid application, the flange 18 being secured in position on the sleeve by turning outwardly the adjacent end of the sleeve to form an outwardly extending annular shoulder 30 bearing against the outer side of said flange. The bearing assembly, comprising the cups 20 and 21, the cone 22 and the balls 24, is then pressed into the sleeve with the outer side of the cup 20 in position against the internal shoulder 26 of the sleeve. The right end margin of the sleeve is then turned inwardly to form an annular shoulder 31, Fig. 7, which bears firmly against the outer side of the bearing cup 21.

The central openings in the flanges 18 and 19 are preferably made a few thousandths of an inch less in diameter than the external diameter of the sleeve 16 so that when the flanges are positioned on the sleeve they take a tight frictional grip thereon thereby tending to prevent any turning movement of the flanges on the sleeve. As it is difficult in commercial operations to hold the dimensions of the parts so that the flanges always have a tight frictional grip on the sleeves, we prefer to provide radially extending serrations 32 in the outer faces of the flanges around their central openings, see Fig. 5, and similarly extending serrations 33 in the inner faces of the shoulders 27 and 30. Since the tread member 17 is held between the flanges 18 and 19 under a pressure of several hundred pounds per square inch, the serrations in the flanges 18 and 19 co-engage with those in the adjacent shoulders and effectively prevent any turning of the flanges on the sleeve.

In the form of our invention shown in Figs. 8 to 14 inclusive, the sleeve 34 is formed of a strip of sheet metal 35 rolled or pressed into form so as to provide inwardly extending annular shoulders 36 and 37 which are formed by offsetting the edge portions of the strip with respect to the main or central portion thereof. The strip 35 is bent into the form of the split sleeve 34 with the annular shoulders 36 and 37 on the inside thereof. The ends of the strip 35 are cut on a bias so that when the strip is bent into the form of a sleeve the meeting edges thereof extend obliquely with respect to the axis of the sleeve as shown at 38, Fig. 10.

In this form of our invention the bearing assembly, comprising the cups 20 and 21, the cone 22 and the balls 24, is positioned within the sleeve before the sleeve is completely closed or bent into the form shown in Figs. 9 and 10, the outer side of the cup 20 bearing against the shoulder 36 and the outer side of the cup 21 bearing against the shoulder 37. One of the flanges, for example the flange 39, is then slipped onto the sleeve from the right end, as shown in Fig. 11, against the external shoulder 40 of the sleeve. The right end margin of the sleeve is then turned outwardly and backwardly into the form of an annular shoulder 41 bearing against the outer side portion of the flange 39. A ring of soft rubber-like material of suitable quality and of a predetermined shape and size to form the tread member 17 of the completed wheel is expanded diametrically by sliding it over a tapered driftpin and it is then forced onto the sleeve against the inner side of the flange 39, as shown in Fig. 13, all in the manner described in the aforesaid application. The flange 42 is then placed against the opposite side of the tread member and that member is then further expanded diametrically and is substantially compressed axially in the manner heretofore described, the flange 42 being secured in position on the sleeve against the external shoulder 43 by turning outwardly and backwardly the margin of the adjacent end of the sleeve to form an annular shoulder 44 bearing against the outer side of said flange.

The central openings in the flanges 39 and 42 are preferably made of such size internally with respect to the external diameter of the margins of the sleeve that they take a tight frictional grip thereon. Radially extending serrations 45 may be formed in the external shoulders 40 and 43 of the sleeve and serrations similar to those shown in Fig. 5 may be provided on the inside faces of the flanges 39 and 42 so that when the flanges are locked in position by the shoulders 41 and 44 the flanges will be prevented from turning on the sleeve.

In this form of our invention, the shoulder 41 of the sleeve in making the wheel is placed firmly against a suitable seat while the shoulder 44 on the opposite end of the sleeve is being formed or turned outwardly and backwardly against the adjacent flange. The operation of locking the second flange in position results in the internal shoulders 36 and 37 of the sleeve being brought into close fitting engagement with the outer sides or edges of the respective bearing cups and they are securely held thereby against spreading apart under any stress encountered in the ordinary operation of the wheel.

In both forms of our invention, a single sleeve performs the double function of providing effective holding means for the flanges at the opposite sides of the compressed tread member and also at the opposite sides of the cooperating bearing cups. The expanded and compressed tread member closely surrounding the sleeve between the tightly fitting flanges 18 and 19, greatly strengthen the sleeve and effectively prevent it from opening up. The bearing cups 20 and 21 are preferably a few thousandths of an inch greater in external diameter than the internal diameter of the sleeve so that the bearing cups have to be forced into the sleeve which further aids in rigidifying and strengthening the sleeve. The cooperative relation of the parts augments the holding power of the external shoulders bearing against the outer sides of the tread holding flanges and that of the internal shoulders bearing against the outer side edges of the bearing cups. In other words, the flanges and the tread member on the outside of and surrounding the sleeve tend to hold the sleeve strongly about the bearing cups while the bearing cups fitting tightly within the sleeve tend to maintain the sleeve in tight fitting engagement with the tread member and its supporting flanges. It is obvious, therefore, that maximum strength of the parts is attained with a minimum amount of metal. By cutting the strips of metal forming the sleeves on a bias at each end, the meeting edges of the split sleeve extend obliquely with respect to the axis of the wheel, no axially extending line of weakness being present in the side of the sleeve. Whatever weakness may be present due to the obliquely extending meeting edges of the sleeve is gradually approached in the turning of the wheel and is of such minor significance that it may be ignored.

While we have illustrated and have specifically described wheels of certain constructions for use in particular on roller skates, it is to be understood that such has been done merely for the purposes of illustrating the principles of our invention and teaching those skilled in the art how to produce, according to our invention, wheels for widely different uses. We wish it to be understood also that our invention is not limited to the particular arrangements illustrated and described as changes may be made therein without departing from the principles of the invention.

We claim:

1. In a wheel for roller skates and the like, the combination of a sleeve formed of sheet metal and split obliquely with respect to its axis from end to end, a tread of soft rubber-like material on said sleeve, and flanges on the opposite ends of said sleeve at the opposite sides of said tread member serving to hold said tread member in substantially compressed condition axially and secured in position on the sleeve by shoulder means on the sleeve engaging outer portions of the flanges.

2. In a wheel of the type described, the combination of a sleeve formed of sheet metal and split obliquely with respect to its axis from end to end, a tread of soft rubber-like material on said sleeve, flanges on the opposite ends of said sleeve at the opposite sides of said tread member serving to hold said tread member in substantially compressed condition axially and secured in position on the sleeve by shoulder means on the sleeve engaging outer portions of the flanges, and an anti-friction bearing within the sleeve, said bearing being held against axial movement with respect to the sleeve by inwardly extending shoulder means on the sleeve and disposed against the respective outer sides of the bearing.

3. In a wheel of the type described, the combination of a sleeve formed of sheet metal and split obliquely with respect to its axis from end to end, a tread of soft rubber-like material on said sleeve, flanges on the opposite ends of said sleeve at the opposite sides of said tread member serving to hold said tread member in substantially compressed condition axially and secured in position on the sleeve by shoulder means on the sleeve engaging outer portions of the flanges, and a ball bearing within the sleeve comprising two cups having raceways for the balls, said cups being held against axial movement with respect to each other and the sleeve by inwardly extending shoulder means on the sleeve and disposed respectively against outer portions of the cups.

4. In a wheel of the type described, the combination of a sleeve formed of sheet metal and split obliquely with respect to its axis from end to end, a tread of soft rubber-like material on said sleeve, flanges on the opposite ends of said sleeve at the opposite sides of said tread member serving to hold said tread member in substantially compressed condition axially and secured in position on the sleeve by shoulder means on the sleeve engaging outer portions of the flanges, and a ball bearing within the sleeve comprising two cups having raceways for the balls, said cups being placed in edge to edge relation within the sleeve and being held against axial movement with respect to each other and the sleeve by inwardly extending shoulder means on the sleeve and disposed respectively against the outer portions of the cups.

5. In a wheel of the class described; the combination of a sleeve; a tread member of soft rubber-like material on said sleeve; flanges on the opposite ends of said sleeve at the opposite sides of the tread member; and a ball bearing within said sleeve and comprising two cups having raceways for the balls; said sleeve at one end being turned inwardly to provide an annular shoulder bearing against an outer portion of the adjacent cup and turned outwardly to provide an annular shoulder bearing against an outer side portion of the adjacent flange; said sleeve at its other end being turned outwardly to provide an annular shoulder bearing against an outer side portion of the other flange, whereby the tread member is held in substantially compressed condition axially on the sleeve, and turned inwardly to provide an annular shoulder bearing against an outer portion of the adjacent or other cup, whereby the bearing cups are held against axial movement with respect to each other and the sleeve.

6. In a wheel of the class described; the combination of a sleeve; a tread member of soft rubber-like material on said sleeve; flanges on the opposite ends of said sleeve at the opposite sides of the tread member; and a ball bearing within said sleeve and comprising two cups having raceways for the balls, said cups being placed in edge to edge relation within the sleeve; said sleeve at one end being turned inwardly to provide an annular shoulder bearing against an outer side portion of the adjacent cup and turned outwardly to provide an annular shoulder bearing against an outer side portion of the adjacent flange; said sleeve at its other end being turned outwardly to provide an annular shoulder bearing against an outer side portion of the other flange, whereby the tread member is held in substantially compressed condition axially on the sleeve, and turned inwardly to provide an annular shoulder bearing against an outer side portion of the adjacent or other cup, whereby the bearing cups are held against axial movement with respect to each other and the sleeve.

7. In a wheel of the class described; the combination of a sleeve; a tread member of soft rubber-like material on said sleeve; flanges on the opposite ends of the sleeve at the opposite sides of the tread member; and a ball bearing within the sleeve and comprising two cups having raceways for the balls; said sleeve at each end being turned inwardly to provide annular shoulders bearing against outer portions of the respective cups and being turned outwardly to provide annular shoulders bearing against outer side portions of the respective flanges, whereby said cups are held against movement axially with respect to each other and the sleeve and said tread member is held in substantially compressed condition axially and against circumferential movement relative to the sleeve.

8. In a wheel of the class described; the combination of a sleeve; a tread member of soft rubber-like material on said sleeve; flanges on the opposite ends of the sleeve at the opposite sides of the tread member; and a ball bearing within the sleeve and comprising two cups having raceways for the balls, said cups being placed in edge to edge relation within the sleeve; said sleeve at each end being turned inwardly to provide annular shoulders bearing against outer side portions of the respective cups and being turned outwardly to provide annular shoulders bearing against outer side portions of the respective flanges, whereby said cups are held against movement axially with respect to each other and the sleeve and said tread member is held in substantially compressed condition axially and against circumferential movement relative to the sleeve.

EDWARD A. GRANGE.
ERWIN J. SCHMIDT.